US009738030B2

(12) United States Patent
Lee et al.

(10) Patent No.: US 9,738,030 B2
(45) Date of Patent: Aug. 22, 2017

(54) THREE-DIMENSIONAL PRINTING HEAD

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yang-Teh Lee, New Taipei (TW); Yi-Chin Tang, New Taipei (TW)

(73) Assignees: ZYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 62 days.

(21) Appl. No.: 14/619,811

(22) Filed: Feb. 11, 2015

(65) Prior Publication Data
US 2016/0193778 A1 Jul. 7, 2016

(30) Foreign Application Priority Data

Jan. 5, 2015 (CN) .......................... 2015 1 0001875

(51) Int. Cl.
*B29C 31/00* (2006.01)
*B29C 59/02* (2006.01)
(Continued)

(52) U.S. Cl.
CPC ........ *B29C 59/026* (2013.01); *B29C 67/0055* (2013.01); *B29C 67/0085* (2013.01);
(Continued)

(58) Field of Classification Search
CPC ............ B29C 67/0055; B29C 67/0059; B29C 67/0062; B29C 67/0066; B29C 67/007;
(Continued)

(56) References Cited

U.S. PATENT DOCUMENTS

| 6,238,613 B1 | 5/2001 | Batchelder et al. |
| 2002/0113331 A1* | 8/2002 | Zhang .................. B29C 41/003 264/40.1 |

(Continued)

FOREIGN PATENT DOCUMENTS

CN        103350507 A  * 10/2013  ......... B29C 67/0055

OTHER PUBLICATIONS

Search Report dated Jun. 15, 2015 of the corresponding European patent application.

*Primary Examiner* — Ryan Ochylski
(74) *Attorney, Agent, or Firm* — Chun-Ming Shih; HDLS IPR Services

(57) ABSTRACT

A three-dimensional printing head includes a housing (100), a fusing module (200) arranged in the housing (100), and a heat dissipation module (300). The fusing module (200) is disposed in the housing (100) and includes a feeding tube (210) with both ends open. A feeding inlet (211) for receiving a filament material (20) is at one end of the feeding tube (210), a supplying nozzle (220) is at the other end of the feeding tube (210), and multiple fins (212) are formed outside of the feeding tube (210). A heater (230) is disposed at the supplying nozzle (220) to heat the same for melting the filament material (20). The heat dissipation module (300) includes a fan (310) arranged in the housing (100), and the fan (310) has an inlet side (311) and an outlet side (312) opposite thereto. The outlet side (312) is arranged toward the fusing module (200).

9 Claims, 8 Drawing Sheets

(51) Int. Cl.
*B29C 67/00* (2017.01)
*B33Y 30/00* (2015.01)
*B33Y 40/00* (2015.01)
*B29L 31/00* (2006.01)
*B29C 47/00* (2006.01)
*B29C 47/08* (2006.01)
*B29C 47/10* (2006.01)
*B29C 47/86* (2006.01)

(52) U.S. Cl.
CPC .......... *B33Y 30/00* (2014.12); *B29C 47/0002* (2013.01); *B29C 47/0014* (2013.01); *B29C 47/0866* (2013.01); *B29C 47/1045* (2013.01); *B29C 47/862* (2013.01); *B29L 2031/767* (2013.01); *B33Y 40/00* (2014.12)

(58) Field of Classification Search
CPC ............ B29C 67/0074; B29C 67/0077; B29C 67/0081; B29C 67/0085; B29C 67/0088; B33Y 30/00; B33Y 10/00; B33Y 50/00; B33Y 50/02
See application file for complete search history.

(56) References Cited

U.S. PATENT DOCUMENTS

2009/0189964 A1\* 7/2009 Nagamine .................. B41J 2/03
347/90
2012/0164256 A1 6/2012 Swanson et al.

\* cited by examiner

THREE-DIMENSIONAL PRINTING HEAD

BACKGROUND

1. Technical Field

The technical field relates to a three-dimensional (3D) printing head and, in particular, to a removable and assemblable three-dimensional printing head including a heat dissipation module.

2. Related Art

Fused Deposition Modeling (FDM) is also called FFM (Fused Filament Fabrication), which is one way to carry out three-dimensional (3D) printing. During the FDM printing, a material is heated to reach a certain temperature at first to become at half-melted state. Then, the material is extruded onto a flat rack and rapidly cures to a solid state. By repeatedly performing layer-by-layer stacking processes, a 3D object can be printed out. Existing FDM printing technique generally includes a feeding tube. One end of the feeding tube is for inputting a filament shaped material. A nozzle is disposed at the other end of the feeding tube. The nozzle is heated. The material passes through the feeding tube to the nozzle, and then it is melted by the nozzle and is extruded from the nozzle.

If heat of the nozzle is transferred to the feeding tube, the heat may cause the material in the feeding tube to be melted and clog the feeding tube. Therefore, usually a fan is disposed to cool the feeding tube by blowing air to the same. It is a disadvantage of such a structure that the feeding tube has low heat exchange efficiency due to its small heat dissipation surface, and the airflow also flows to the nozzle to cool the nozzle, so the melted material in the nozzle may cure and clog the nozzle.

Another improved feeding tube dissipates heat by utilizing a heat conduction block disposed on the feeding tube. The heat conduction block is connected to a fin set via a heat pipe. After the heat of the feeding tube is transferred to the fin set via the heat pipe, a fan is used to perform heat dissipation by forcible convection. However, such a structure has a disadvantage of large size.

In view of the foregoing, the inventor made various studies to improve the above-mentioned problems, on the basis of which the present disclosure is accomplished.

BRIEF SUMMARY

The present disclosure is directed to a removable and assemblable three-dimensional (3D) printer carriage including a heat dissipation module.

The present disclosure provides a three-dimensional printing head which comprises a housing, a fusing module, and a heat dissipation module. The fusing module is disposed inside the housing and includes a feeding tube with both ends open. One end of the feeding tube includes a feeding inlet for receiving a filament material. A supplying nozzle is disposed at the other end of the feeding tube. A plurality of fins are formed outside of the feeding tube. A heater is disposed at the supplying nozzle for heating the supplying nozzle to melt the filament material. The heat dissipation module includes a fan disposed in the housing, the fan includes an inlet side and an outlet side opposite thereto, and the outlet side is disposed toward the fusing module.

It is preferable that the heat dissipation module includes a air leading cover covering the outlet side of the fan, the air leading cover includes a air outlet, and the air outlet is disposed toward the fins. An area of the air outlet is corresponding to an area of the fins. The housing includes an air inlet, and the air inlet is disposed corresponding to the inlet side of the fan. The housing includes an air outlet, and the fins are disposed between the air outlet and the outlet side of the fan.

It is preferable that the feeding tube and the supplying nozzle are assembled with each other. The heater is inserted into the supplying nozzle. The housing includes a tube joint disposed corresponding to the feeding inlet. A hook is protrudingly disposed on an outer surface of the housing, the hook is provided for hooking a carrier, and the carrier is disposed at a movable platform and is movable on the movable platform.

According to the present disclosure, the fins are directly formed on the feeding tube of the 3D printer, so the fins can be directly cooled by airflow produced by the heat dissipation module, whereby the size of the three-dimensional printing head is reduced.

DETAILED DESCRIPTION

Figure 1:
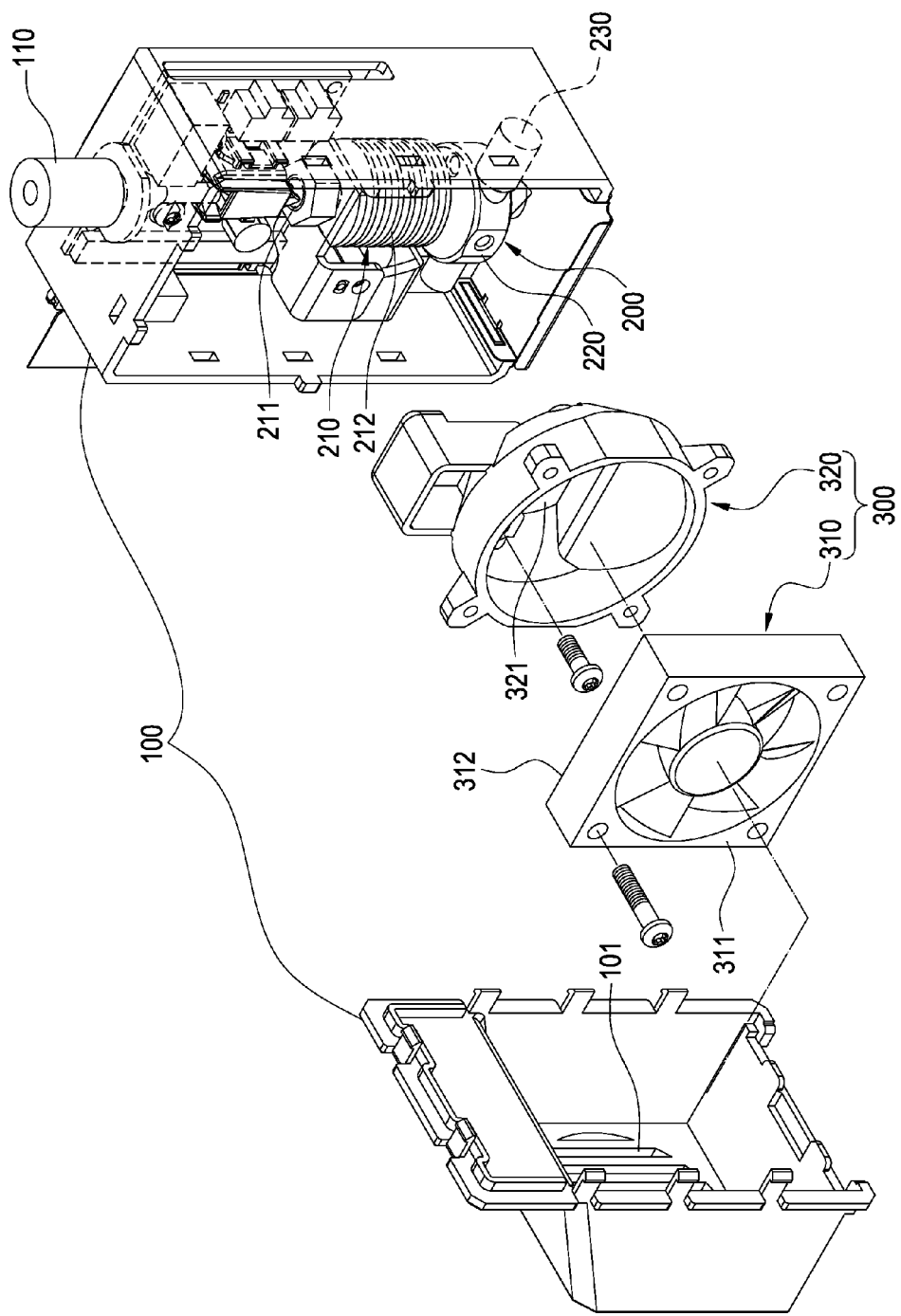
FIG. 1 is a perspective exploded view of a three-dimensional printing head according to a preferable embodiment of the present disclosure.

Referring to FIGS. 1 to 4, a preferable embodiment of the present disclosure provides a three-dimensional printing head which includes a housing 100, a fusing module 200, and a heat dissipation module 300.

According to the present embodiment, the housing 100 is constituted by parts assembled together. The housing 100 can be constituted by plastic parts only, or can be constituted by plastic parts and metallic parts assembled together. The housing 100 includes an air inlet 101. The housing 100 includes an air outlet 102. The housing 100 includes a tube joint 110, and a pair of hooks 120 is protrudingly disposed on an outer surface of the housing 100.

The fusing module 200 is disposed in the housing 100. The fusing module 200 includes a feeding tube 210. The feeding tube 210 is preferably a metallic tube with both ends open. One end of the feeding tube 210 includes a feeding inlet 211 disposed corresponding to the tube joint 110. A supplying nozzle 220 is disposed at the other end of the feeding tube 210. A plurality of fins 212 are formed outside of the feeding tube 210. According to the present embodiment, the feeding tube 210 and the supplying nozzle 220 are made of different metallic materials. The feeding tube 210 and the supplying nozzle 220 are assembled with each other. The specific heat of the supplying nozzle 220 is preferably higher than the specific heat of the feeding tube 210. A heater 230 is disposed at the supplying nozzle 220. In the present embodiment, the heater 230 is a pillar shaped metallic rod, and is transversely inserted into the supplying nozzle 220 to heat the supplying nozzle 220 (the heater 230 is not inserted into an inner space of the supplying nozzle 220).

Figure 2:
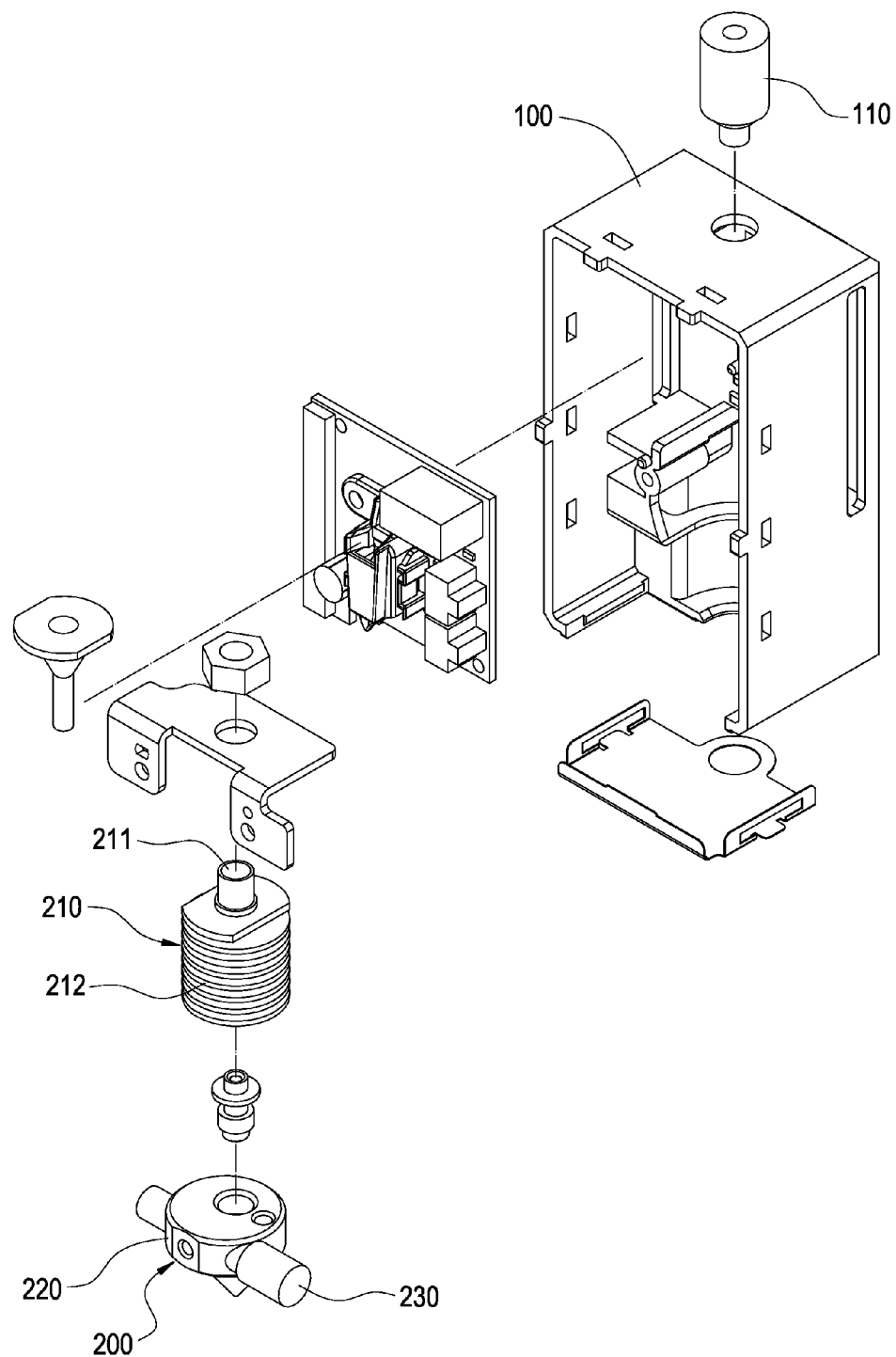
FIG. 2 is a partial perspective exploded view of the three-dimensional printing head according to the preferable embodiment of the present disclosure.
Figure 3:
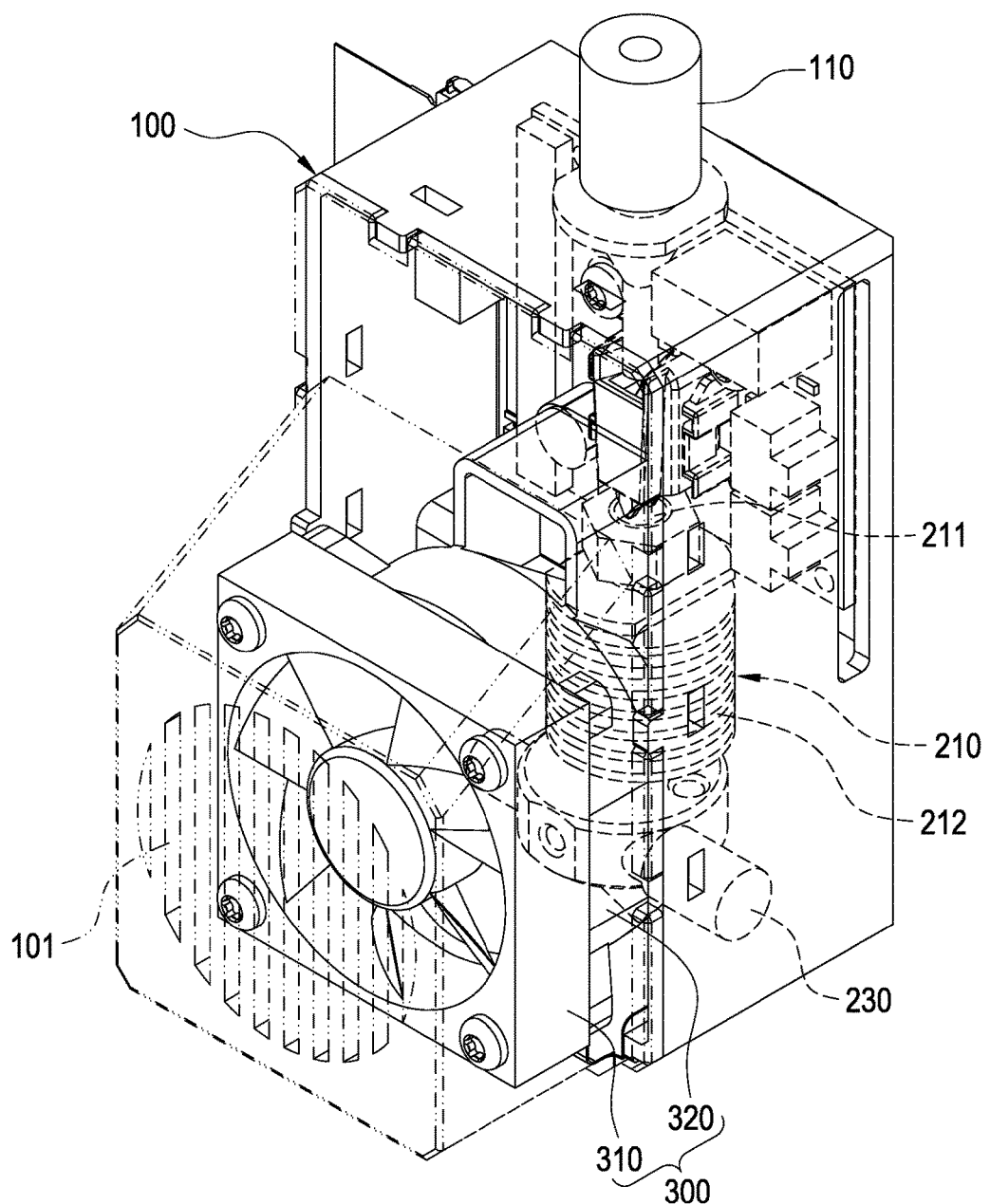
FIG. 3 is a perspective view of the three-dimensional printing head according to the preferable embodiment of the present disclosure.
Figure 5:
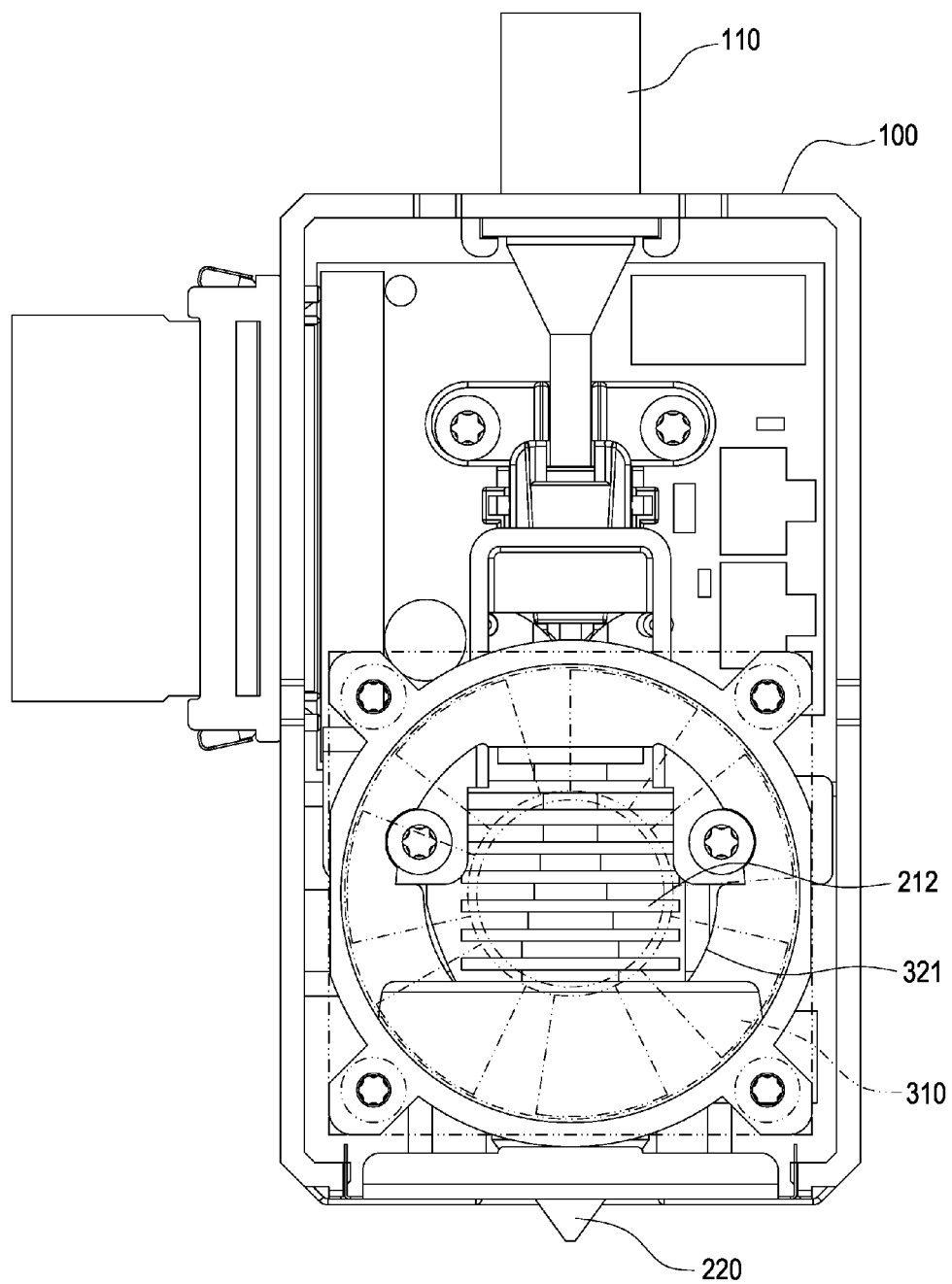
FIG. 5 is a perspective view of the three-dimensional printing head according to the preferable embodiment of the present disclosure.

Referring to FIGS. 1, 2, and 5, the heat dissipation module 300 includes a fan 310 and a air leading cover 320 which are disposed in the housing 100. The fan 310 includes an inlet side 311 and an outlet side 312 opposite thereto, and the outlet side 312 is disposed toward the fusing module 200. The housing 100 includes an air inlet 101, and the air inlet 101 is disposed corresponding to the inlet side 311 of the fan 310. The fins 212 are disposed between the air outlet 102 and the outlet side 312 of the fan 310. The air leading cover 320 covers the outlet side 312 of the fan 310, the air leading cover 320 includes a air outlet 321, and the air outlet 321 is disposed toward the fins 212. An area of the air outlet 321 is corresponding to an area of the fins 212.

Figure 4:
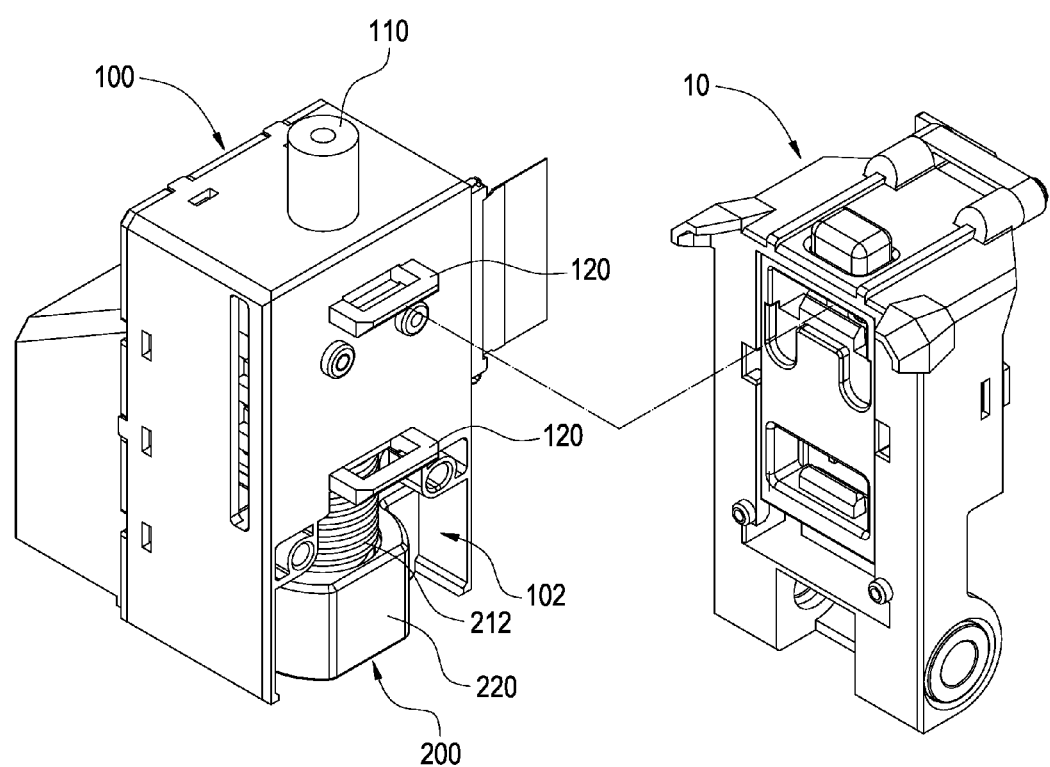
FIG. 4 is a use state view of the three-dimensional printing head according to the preferable embodiment of the present disclosure.
Figure 6:
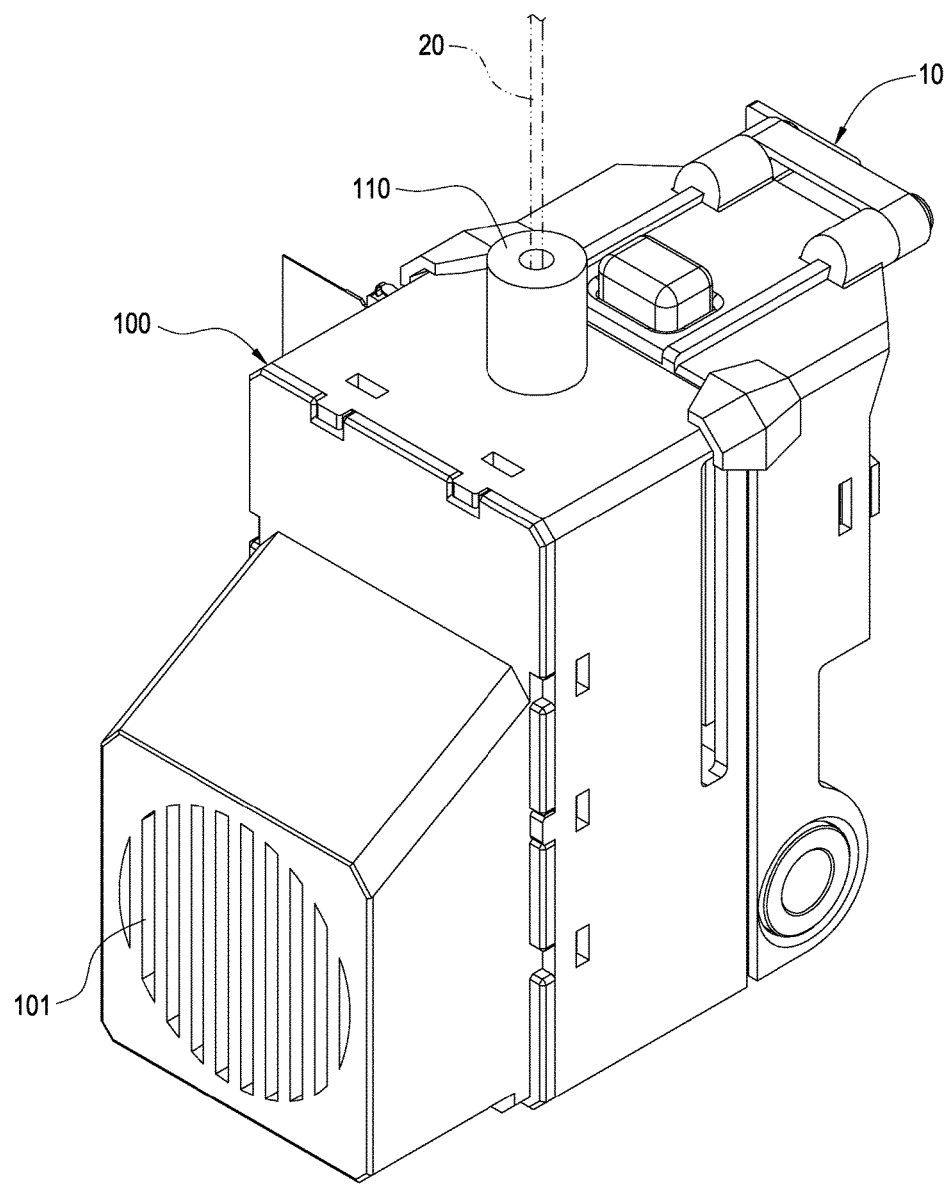
FIG. 6 is another use state view of the three-dimensional printing head according to the preferable embodiment of the present disclosure.
Figure 7:
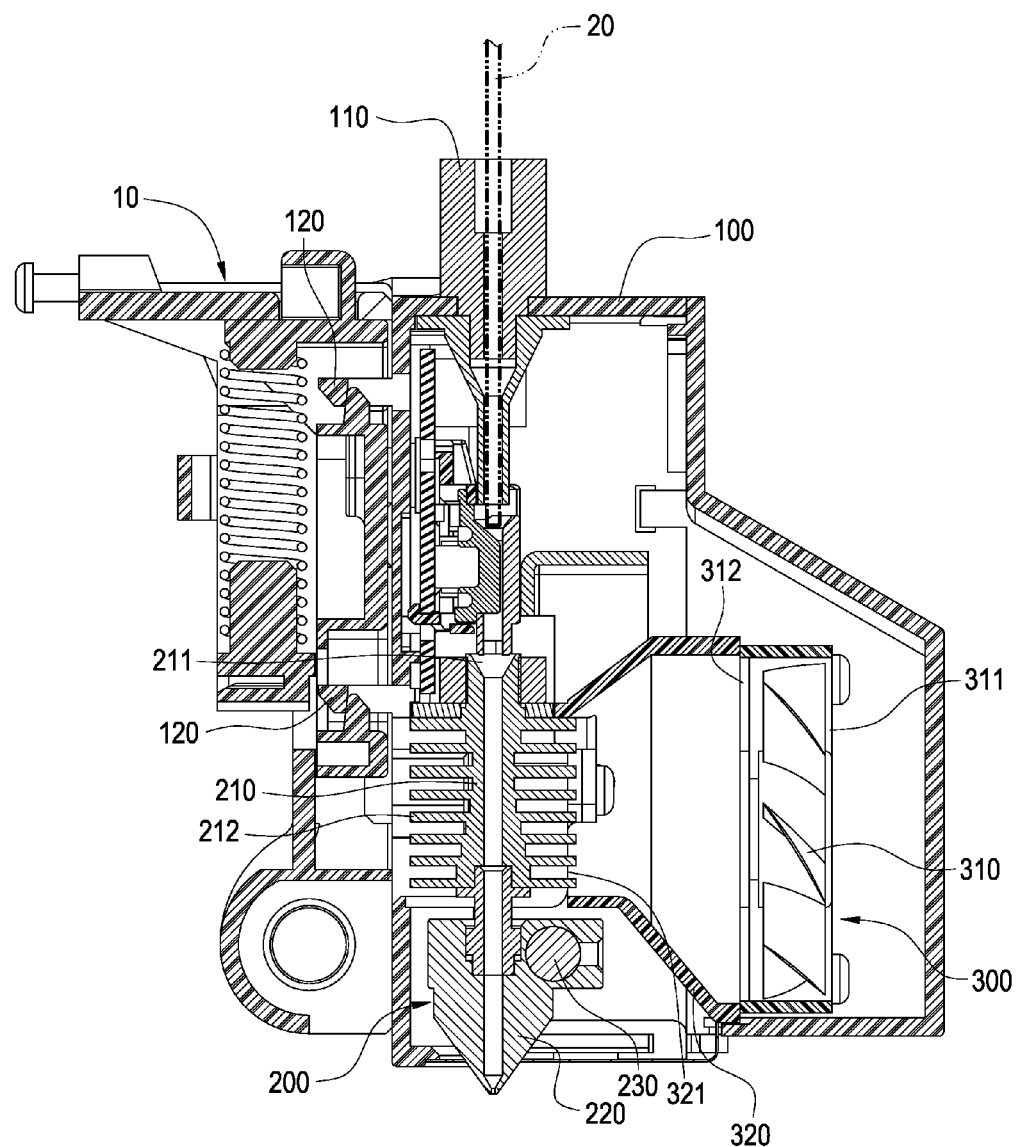
FIG. 7 is a cross-sectional view illustrating the use state of the three-dimensional printing head according to the preferable embodiment of the present disclosure.

Referring to FIGS. 4, 6, and 7, the there-dimensional printing head of the present embodiment is disposed on a carrier 10. The carrier 10 is disposed on a movable platform and is movable on the movable platform. The hook 120 on the outer surface of the housing 100 hooks the carrier 10, so that the carrier 10 drives the three-dimensional printing head to move horizontally on the movable platform. The three-dimensional printing head of the present embodiment utilizes a connecting tube to connect a supplying module via a tube joint 110. The supplying module outputs the filament material 20 to the feeding tube 210 of the three-dimensional printing head, and the filament material 20 enters the feeding tube 210 via the feeding inlet 211.

Figure 8:
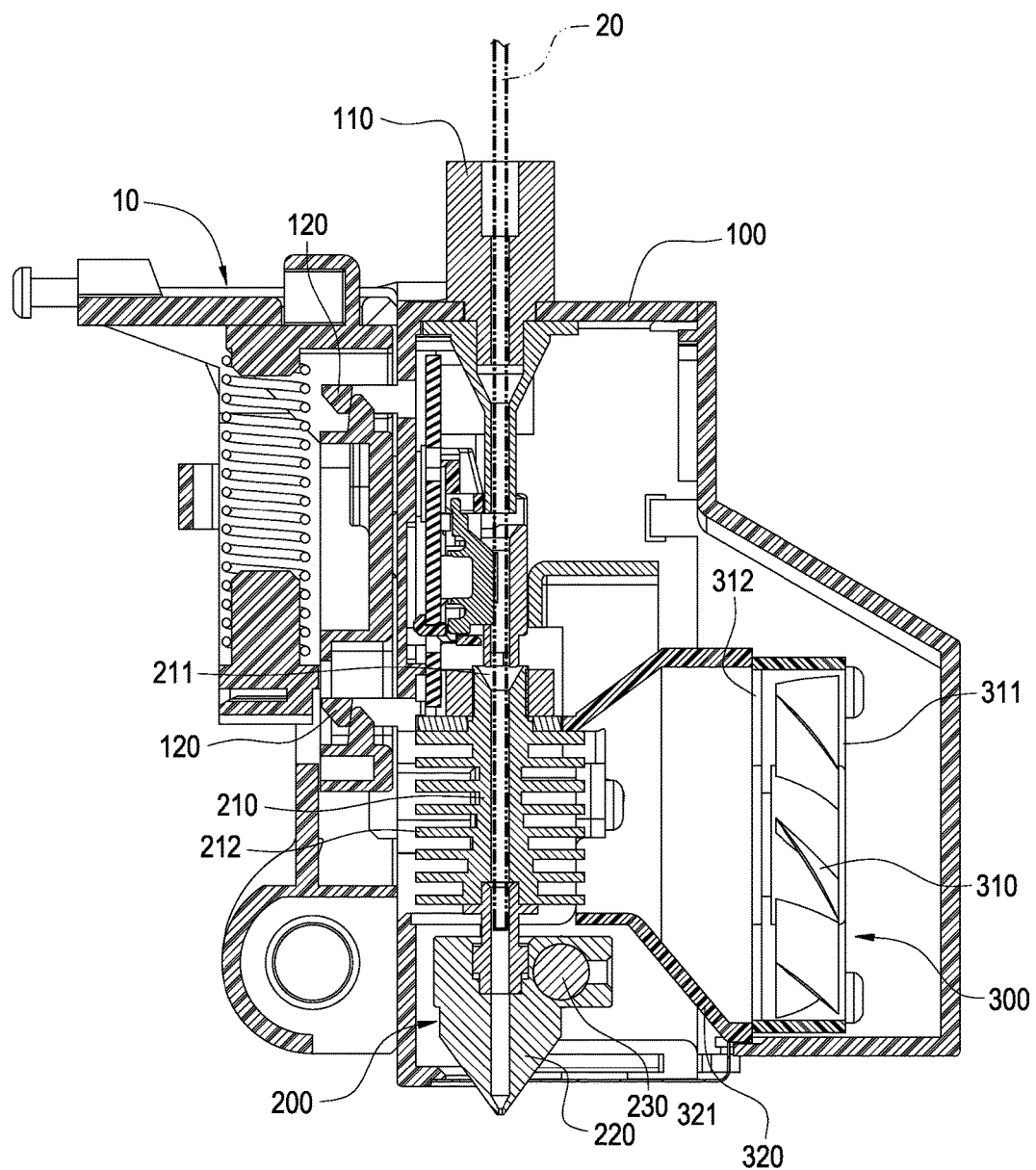
FIG. 8 is another cross-sectional view illustrating the use state of the three-dimensional printing head according to the preferable embodiment of the present disclosure.

Referring to FIGS. 7 and 8, the heater 230 heats the supplying nozzle 220. When the filament material 20 enters the supplying nozzle 220, the filament material 20 is melt to a fluid state by the supplying nozzle 220 and is extruded out from the supplying nozzle 220.

According to the present embodiment, the fusing module 200 and the heat dissipation module 300 are incorporated into the three-dimensional printing head. Fins 212 are directly formed on the feeding tube 210 of the fusing module 200, so the heat dissipation module 300 can directly cool the fins 212 by blowing air, whereby a size of the three-dimensional printing head can be reduced. Furthermore, the heat dissipation module 300 is utilized for cooling the temperature of the feeding tube 210 and the supplying nozzle 220, so the present embodiment is suitable for the filament material 20 having a low melting point. Polylactic acid/polylactide (PLA) softens while be heated over about 60 degrees (under the melting point of PLA). The heat dissipation module 300 utilizes the air leading cover 320 to guide airflow to flow to the fins 212 only and not to flow to the supplying nozzle 220. Therefore, the supplying nozzle 220 is maintained at high temperature to melt the filament material 20. At the same time, the heat of the heater 230 is prevented from transferring to the feeding tube 210, so the feeding tube 210 is prevented from being overheated to cause the filament material 20 early soften in the feeding tube 210 before fed into the supplying nozzle 220 for holding in the non-fluid state. Moreover, the feeding tube 210 and the supplying nozzle 220 are manufactured from different materials and assembled together. Thus, the temperature of the feeding tube 210 and the supplying nozzle 220 can be controlled effectively to reduce the heat conduction between the feeding tube 210 and the supplying nozzle 220.

In summary, the there-dimensional printing head has a small size, can be replaced easily, achieves smooth feeding of material, and prevents clogging.

It is to be understood that the above descriptions are merely preferable embodiment of the present disclosure and not intended to limit the scope of the present disclosure. Equivalent changes and modifications made in the spirit of the present disclosure are regarded as falling within the scope of the present disclosure.

What is claimed is:
1. A three-dimensional printing head, comprising:
a housing (100);
a fusing module (200) disposed in the housing (100), the fusing module (200) including a feeding tube (210), a feeding inlet (211) for receiving a solid filament material (20) at one end of the feeding tube (210), a supplying nozzle (220) being disposed at the other end of the feeding tube (210), a plurality of fins (212) being formed outside of the feeding tube (210), a heater (230) being disposed at the supplying nozzle (220) for heating the supplying nozzle (220) to melt the filament material (20); a heat dissipation module (300) including a fan (310) disposed in the housing (100), the fan (310) including an inlet side (311) and an outlet side (312) opposite thereto, the outlet side (312) being disposed toward the fins(212) of the fusing module (200),
wherein the heat dissipation module (300) includes an air leading cover (320), and the air leading cover (320) includes an air outlet side (321) and an air inlet side, the air outlet side (321) faces the plurality of the fins (212), and the air inlet side faces the fan (310);
wherein the air leading cover (320) is disposed between the plurality of fins (212) and the fan (310) to directly contact the outlet side (312) of the fan (310) and the plurality of fins (212), and
wherein the plurality of fins (212) cover the air outlet (321) of the air leading cover (320) so that the fan supplies air flowing only to the fins (212) but not to the supplying nozzle (220) for dissipating heat from only the feeding tube (210) and preventing heat transfer from the supplying nozzle (220) to the feeding tube (210) so that the feeding tube (210) is prevented from being overheated, and the solid filament material is hereby prevented from being softened early in the feeding tube (210) before being fed into the supplying nozzle (220),
wherein the feeding tube (210) and the supplying nozzle (220) are made of different metallic materials.
2. The three-dimensional printing head of claim 1, wherein an area of the air outlet (321) is corresponding to an area of the fins (212).
3. The three-dimensional printing head of claim 1, wherein the housing (100) includes an air inlet (101), and the air inlet (101) is disposed corresponding to the inlet side (311) of the fan (310).
4. The three-dimensional printing head of claim 1, wherein the housing (100) includes an air outlet (102), and the fins (212) are disposed between the air outlet (102) and the outlet side (312) of the fan (310).
5. The three-dimensional printing head of claim 1, wherein the feeding tube (210) and the supplying nozzle (220) are assembled with each other.

6. The three-dimensional printing head of claim 1, wherein the heater (230) is inserted into the supplying nozzle (220).

7. The three-dimensional printing head of claim 1, wherein the housing (100) includes a tube joint (110) disposed corresponding to the feeding inlet (211).

8. The three-dimensional printing head of claim 1, wherein a hook 120 is protrudingly disposed on an outer surface of the housing (100), the hook (120) is provided for hooking a carrier (10), and the carrier (10) is disposed at a movable platform and is movable on the movable platform.

9. The three-dimensional printing head of claim 1, wherein the specific heat of the supplying nozzle (220) is higher than the specific heat of the feeding tube (210).

* * * * *